United States Patent
Takata et al.

(10) Patent No.: US 7,747,104 B2
(45) Date of Patent: Jun. 29, 2010

(54) IMAGE GENERATING METHOD, OBJECT DETECTING METHOD, OBJECT DETECTING EQUIPMENT, AND IMAGE GENERATING PROGRAM

(75) Inventors: Kazutoyo Takata, Osaka (JP); Kunio Nobori, Osaka (JP)

(73) Assignee: Panasonic Corporation, Osaka (JP)

( * ) Notice: Subject to any disclaimer, the term of this patent is extended or adjusted under 35 U.S.C. 154(b) by 989 days.

(21) Appl. No.: 11/503,891

(22) Filed: Aug. 14, 2006

(65) Prior Publication Data
US 2007/0003164 A1 Jan. 4, 2007

Related U.S. Application Data

(63) Continuation of application No. PCT/JP2006/302731, filed on Feb. 16, 2006.

(30) Foreign Application Priority Data
Mar. 2, 2005 (JP) .............................. 2005-057411

(51) Int. Cl.
G06K 9/36 (2006.01)
(52) U.S. Cl. ..................................................... 382/284
(58) Field of Classification Search ................. 382/284, 382/293, 294; 348/36, 95
See application file for complete search history.

(56) References Cited

U.S. PATENT DOCUMENTS

| | | | |
|---|---|---|---|
| 6,654,414 B1 * | 11/2003 | Narayanaswami | 375/240.01 |
| 6,885,392 B1 * | 4/2005 | Mancuso et al. | 348/36 |
| 6,898,518 B2 * | 5/2005 | Padmanabhan | 701/207 |
| 7,091,988 B2 * | 8/2006 | Hori et al. | 345/619 |
| 7,136,452 B2 * | 11/2006 | Spartiotis et al. | 378/19 |
| 7,194,112 B2 * | 3/2007 | Chen et al. | 382/106 |

| | | | |
|---|---|---|---|
| 2001/0033685 A1 | 10/2001 | Ishiyama | |
| 2003/0035098 A1 | 2/2003 | Ishiyama | |

FOREIGN PATENT DOCUMENTS

| | | | |
|---|---|---|---|
| EP | 1143375 A3 | 5/2004 | |
| JP | 2001-283216 A | 10/2001 | |
| JP | 2002-150264 A | 5/2002 | |
| JP | 2003-058896 A | 2/2003 | |

(Continued)

OTHER PUBLICATIONS

Weng et al., "Computer Vision Technology Review and Future Prospects," New Technology Communication, 1998, pp. 42-44, Partial English Translation.

(Continued)

*Primary Examiner*—Yosef Kassa
(74) *Attorney, Agent, or Firm*—Harness, Dickey & Pierce, P.L.C.

(57) ABSTRACT

A small region panorama image group ($I_1^P$, $I_2^P$, $I_3^P$) is generated in advance. The small region panorama image group ($I_1^P$, $I_2^P$, $I_3^P$) includes images including a common shooting range, being composed of a plurality of common partially overlapped regions (A, B, C, D), and having independency from each other in each partially overlapped region (A, B, C, D). With the use of the small region panorama image group ($I_1^P$, $I_2^P$, $I_3^P$), a predicted background image is generated in which light source environment is the same as that of a shot target image.

6 Claims, 11 Drawing Sheets

FOREIGN PATENT DOCUMENTS

JP 2004-213572 A 7/2004

OTHER PUBLICATIONS

"Research and Development report from Natural Vision Research & Development Project (Advanced Video Display/Transmission System) 2000," Communication and Broadcast Organization, 2001, pp. 51-53, Parital English Translation.

Shashua, A., "Geometry and Photometry in 3D Visual Recognition," Ph. D thesis, Department of Brain and Cognitive Sciences, Massachusetts Instutute of Technology, Nov. 1992, Cambridge, MA.

Fischler, M. A., et al, "Random Sample Consensus: A Paradigm for Model Fitting with Applications to Image Analysis and Automated Cartography," Communications of the Association for Computing Machinery, vol. 24, Issue 6, Jun. 1981, pp. 381-395.

Ishii, Y. et al, "Photometric Linearization Based on Classification of Photometric Factors," (Collection of Meeting on Image Recognition and Comprehension) (MIRU 2002), vol. 2, pp. 167-176, 2002).

Okabe, T. et al, "Separation of Reflection Components Based on Frequency Characteristics of Bidirectional Reflectance Distribution Functions," Technical Report of Information Processing Society of Japan, CVIM 2002-134-1, pp. 1-8, 2002.

Shashua, A. et al, "The Quotient Image: Class-Based Re-Rendering and Recognition with Varying Illuminations," IEEE Transactions on Pattern Analysis and Machine Intelligence, vol. 23, No. 2, Feb. 2001, pp. 129-139.

Weng et al.,"Computer Vision Technology Review and Future Prospects," New Technology Communication, 1998, pp. 42-44, Partial English Translation.

"Research and Development report from Natural Vision Research & Development Project (Advanced Video Display/Transmission System) 2000," Communication and Broadcast Organization, 2001, pp. 51-53, Partial English Translation.

Shashua, A., "Geometry and Photometry in 3D Visual Recognition," Ph. D thesis, Department of Brain and Cognitive Sciences, Massachusetts Institute of Technology, Nov., 1992, Cambridge, MA.

Fischler, M. A., et al, "Random Sample Consensus: A Paradigm for Model Fitting with Applications to Image Analysis and Automated Cartography," Communications of the Association for Computing Machinery, vol. 24, Issue 6, Jun. 1981, pp. 381-395.

Ishii, Y. et al, "Photometric Linearization Based on Classification of Photometric Factors," (Collection of Meeting on Image Recognition and Comprehension) (MIRU 2002), vol. 2, pp. 167-176, 2002).

Okabe, T. et al, "Separation of Reflection Components Based on Frequency Characteristics of Bidirectional Reflectance Distribution Functions," Technical Report of Information Processing Society of Japan, CVIM 2002 -134-1, pp. 1-8, 2002.

Shashua, A. et al, "The Quotient Image: Class-Based Re-Rendering and Recognition with Varying Illuminations," IEEE Transactions on Pattern Analysis and Machine Intelligence, vol. 23, No. 2, Feb. 2001, pp. 129 -139.

* cited by examiner

Pixel value $i_{1(x_1,y_1)}$
$i_{1(x_2,y_2)}$
$i_{1(x_3,y_3)}$ $i_{2(x_1,y_1)}$
$i_{2(x_2,y_2)}$
$i_{2(x_3,y_3)}$ $i_{3(x_1,y_1)}$
$i_{3(x_2,y_2)}$
$i_{3(x_3,y_3)}$ $i_{4(x_1,y_1)}$
$i_{4(x_2,y_2)}$
$i_{4(x_3,y_3)}$ Coordinate values $P_1 : (x_1, y_1)$
$P_2 : (x_2, y_2)$
$P_3 : (x_3, y_3)$ Detection target image $\mathbf{I}_n$ → Object detection ← Predicted background image $\mathbf{I}_n^E$

US 7,747,104 B2

IMAGE GENERATING METHOD, OBJECT DETECTING METHOD, OBJECT DETECTING EQUIPMENT, AND IMAGE GENERATING PROGRAM

CROSS REFERENCE TO RELATED APPLICATIONS

This is a continuation of Application PCT/JP2006/302731 filed on Feb. 16, 2006. This Non-provisional application claims priority under 35 U.S.C. §119(a) on Patent Application No. 2005-057411 filed in Japan on Mar. 2, 2005, the entire contents of which are hereby incorporated by reference.

BACKGROUND OF THE INVENTION

1. Field of the Invention

The present invention relates to a technology for generating a predicted background image for a currently shot image with the use of images shot in advance under circumference where light source environment and a shooting angle of a camera change and to a technology for detecting an object from the shot image by utilizing the predicted background image.

2. Description of the Prior Art

For object detection using a pan-tilt (PT) camera or the like, a method is effective in which one large panorama image is synthesized from a plurality of shot images of which angles of view are different from each other and image processing of a background difference or the like is performed with the use of the synthesized panorama image as a predicted background image.

As a prior art technique relating to such a predicted background image, for example, Japanese Patent Application Laid Open Publication No. 2002-150264A discloses a method for synthesizing a panorama image in which a motion vector is obtained from camera position, camera posture, and an input image set through an image analysis, a camera parameter is calculated on the basis of the thus obtained motion vector, and images are joined according to the calculated camera parameter. By this method, the respective images can be aligned accurately, so that a predicated background image with less position distortion can be synthesized. Hence, accurate object detection can be performed with the use of this predicted background image.

SUMMARY OF THE INVENTION

In the above prior art technique, however, if light source environment such as position, direction, strength, or number of light sources would change in shooting images to be used for synthesizing a predicted background image, the generated predicted background image would have parts different from each other in light source environment, which means a predicted background image in which light source environment is not uniform. Further, in background difference using such a predicted background image in which light source environment is not uniform as a background, a background region of an image on which object detection is to be performed (hereinafter referred to as detection target image) is different in intensity from a background region of the predicted background image to be used for comparison with the detection target image. Therefore, a region other than an object to be detected would be detected in error as the object, thereby remarkably lowering detection accuracy. Also, if light source environment would change after synthesis of a predicted background image, the light source environment differs between the detection target image and the predicted background image, presenting another problem that accuracy in object detection by background difference is lowered remarkably.

The aforementioned problems caused due to change in light source environment are significant especially in object detection in, for example, outdoors, and must be solved for actual application as a system.

The present invention has been made in view of the foregoing and has its object of enabling generation of a predicted background image in which light source environment is the same as that of a shot target image so that object detection can be performed even when, for example, change in light source environment occurs.

MEANS FOR SOLVING THE PROBLEMS

In order to solve the above problems, the present invention provides an image generating method in which a so-called small region panorama image group is generated and a predicted background image in which light source environment is the same as a shot target image is generated for the shot target image with the use of the thus generated small region panorama image group. Herein, "the small region panorama image group" is an image group of N images, which include a common shooting range, are composed of a plurality of common partially overlapped regions, and have independency from each other in each of the partially overlapped regions, wherein N is an integer larger than 2.

In the present invention, in the generated small region panorama image group, each image has independency from each other in each of the partially overlapped regions. Accordingly, for a target image within a shooting range in the small region panorama image group, a predicted background image in which light source environment is the same as that of the target image can be generate by linearization processing of each partially overlapped region belonging to the target image. In other words, a predicted background image can be generated in which light source environment is the same as that of a target image shot under arbitrary light source environment. Hence, object detection can be performed accurately in the image shot under arbitrary light source environment.

Referring to an object detecting method of the present invention, a predicted background image for a detection target image is generated by the image generating method according to the present invention, and the detection target image and the predicted background image are compared for detecting an object reflected in the detection target image.

EFFECTS OF THE INVENTION

According to the present invention, a predicted background image can be generated in which light source environment is the same as that of an image shot under current arbitrary light source environment with the use of a small region panorama image group generated in advance. As well, a predicted background image can be generated in which light source environment is the same as that of an image shot in an arbitrary shooting direction. Further, accurate object detection can be performed in an image shot under arbitrary light source environment by utilizing the predicted background image.

DESCRIPTION OF THE PREFERRED EMBODIMENTS

Figure 1:
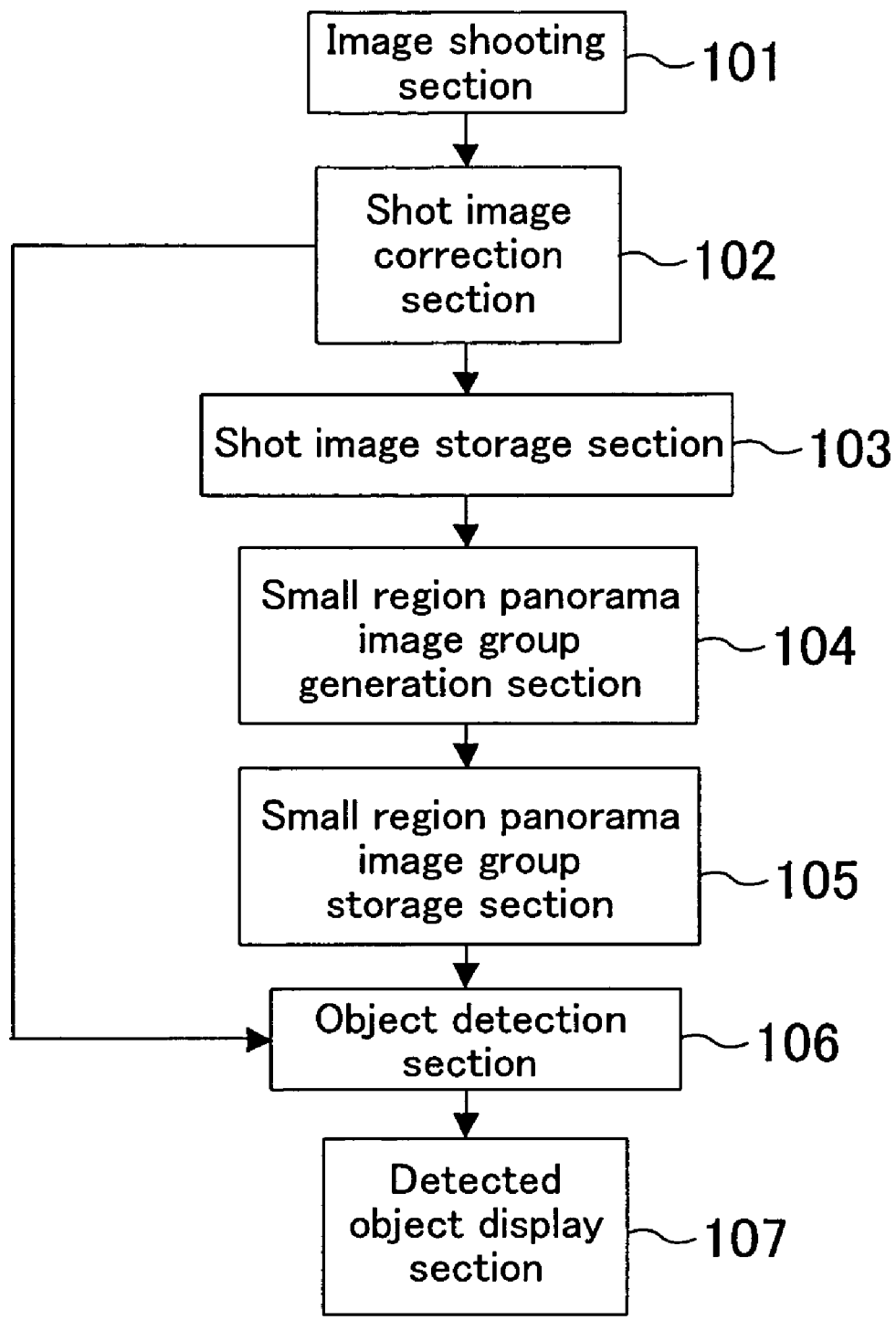
FIG. 1 is a constitutional block diagram of object detecting equipment employing an image generating method according to Embodiment 1 of the present invention.

A first aspect of the present invention provides an image generating method including: a first step of generating a small region panorama image group which is an image group of N images which include a shooting range common to each other, the N images being composed of a plurality of common partially overlapped regions and having independency from each other in each of the partially overlapped regions, wherein N is an integer larger than 2; and a second step of generating, for a target image obtained by shooting at least a part of the shooting range, a predicted background image in which light source environment is the same as that of the target image with the use of the target image and the small region panorama image group.

A second aspect of the present invention provides the image generating method of the first aspect, wherein the first step includes the steps of: selecting N images each including an overlapped region from a plurality of original images; judging independency of the selected N images in the overlapped region; storing, when independency is held, a parts in the overlapped region of the N images as images of a partially overlapped region in the small region panorama image group; and performing, when no independency is held, re-selection of N images each including an overlapped region.

A third aspect of the present invention provides the image generating method of the first aspect, wherein the second step includes, when the target image spreads across a plurality of partially overlapped regions, the steps of: calculating linearization coefficients for the target image in each of the partially overlapped regions with the use of the target image and the small region panorama image group; and generating the predicted background image with the use of the calculated linearization coefficients and the small region panorama image group.

A fourth aspect of the present invention provides an object detecting method including the steps of: generating, by the image generating method of Claim 1, the predicted background image for a detection target image serving as the target image; and detecting an object reflected in the detection target image by comparing the detection target image and the predicted background image with each other.

A fifth aspect of the present invention provides object detecting equipment including: a small region panorama image group generation section for generating, with the use of a plurality of images stored in a shot image storing section, a small region panorama image group which is an image group of N images which include a shooting range common to each other, the N images being composed of a plurality of common partially overlapped regions and having independency from each other in each of the partially overlapped regions, wherein N is an integer larger than 2; and an object detection section for detecting an object reflected in a detection target image obtained by shooting at least a part of the shooting range by generating a predicted background image in which light source environment is the same as that of the detection target image for the detection target image with the use of the detection target image and comparing the small region panorama image group and the detection target image and the predicted background image with each other.

A sixth aspect of the present invention provides an image generating program for allowing a computer to execute image generation, wherein the computer executes: a first step of generating a small region panorama image group which is an image group of N images which includes a shooting range common to each other, the N images being composed of a plurality of common partially overlapped regions and having independency from each other in each of the partially overlapped regions, wherein N is an integer larger than 2; and a second step of generating, for a target image obtained by shooting at least a part of the shooting range, a predicted background image in which light source environment is the same as that of the target image with the use of the target image and the small region panorama image group.

Embodiments of the present invention will be described below with reference to the accompanying drawings.

Embodiment 1

FIG. 1 shows a constitution of object detecting equipment employing an image generating method according to Embodiment 1. In FIG. 1, reference numeral 101 denotes an image shooting section for shooting images, 102 denotes a shot image correction section for correcting each image shot by the image shooting section 101, 103 denotes a shot image storage section for storing each image corrected by the shot image correction section 102, 104 denotes a small region panorama image group generation section for generating a small region panorama image group from the images stored in the shot image storage section 103, 105 denotes a small region panorama image group storage section for storing the small region panorama image group generated by the small region panorama image group generation section 104, 106 denotes an object detection section for performing object detection using a detection target image as a target image, which is shot by the image shooting section 101 and corrected by the shot image correction section 102, and the small region panorama image group stored in the small region panorama image group storage section 105, and 107 denotes a detected object display section for displaying an object region detected by the object detection section 106.

The object detecting equipment shown in FIG. 1 generates a small region panorama image group from a plurality of images of which shooting directions are different from each other and performs object detection with the use of the thus generated small region panorama image group. Operations of the object detecting equipment in FIG. 1 can be divided chronologically into the following three operations:

Shooting is performed, and shot images are corrected and stored.

A small region panorama image group is generated with the use of the stored shot images and is stored.

A predicted background image is synthesized with the use of the stored small region panorama image group and a detection target image shot after storage of the small region panorama image group, and object detection is performed.

These operations are described below in sequence.

Wherein, the object detection herein means detection of objects other than a background from a detection target image shot thereafter in such a manner that a predicted background image for the detection target image is generated with the use of an aggregation of regions of at least three images held in a small region panorama image group and having independency and the generated predicated background image is compared with the detection target image.

Further, it is assumed as to environment conditions that a parallel light source is used as a light source and that the surface of an object is a Lambertian surface for the sake of simple explanation.

<Correction and Storage of Shot Images>

The image shooting section 101 shoots still images or motion images different in shooting direction. Specifically, shooting is performed by, for example, a video camera or a digital still camera capable of a pan-tilt (PT) operation or a video camera or a digital still camera fixed on a pan head capable of a PT operation. Herein, a video camera capable of a PT operation is used.

Figure 2:
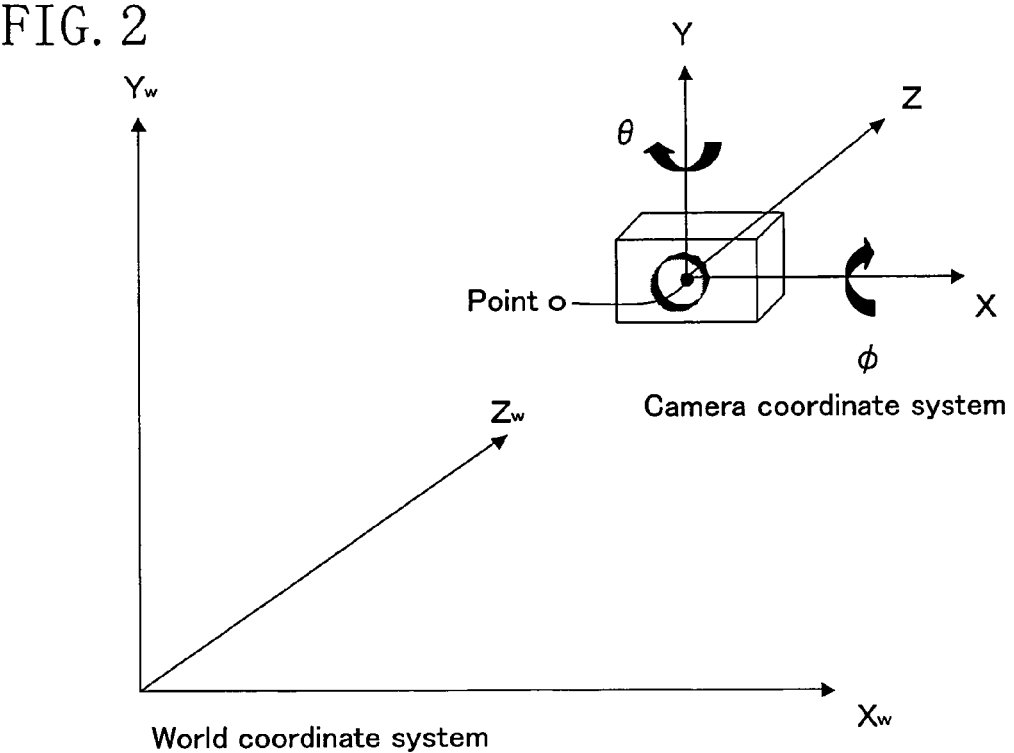
FIG. 2 is a diagram showing a coordinate system that defines position and posture of a camera.

The image shooting section 101 sends the shot images and camera position/posture information thereof to the shot image correction section 102. The camera position/posture information includes five parameters of (Xw, Yw, Zw, θ, φ) indicated in FIG. 2. Wherein, Xw, Yw, and Zw indicate position coordinates (point o) of the camera in a world coordinate system while θ and φ indicate angles (pan angle and tilt angle) at which the Y axis and the X axis are allowed to rotate anticlockwise with respect to the positive direction in a camera coordinate system, respectively. Position detecting equipment such as a GPS and posture detecting equipment such as a gyroscope may be used for detection of camera position and posture, respectively. Alternatively, camera position and posture may be calculated from a shooting plan designed in advance. The shooting plan designed in advance may be, for example, a plan to move a camera from a starting point (X0, Y0, Z0, θ0, φ0) in the positive direction of φ in accordance with uniform motion at an angular velocity of 0.1 π[rad/sec], or the like.

The shot image correction section 102 performs, on the images shot by the image shooting section 101, geometric correction, photometric correction, and coordinate transformation from the coordinate system of each shot image to a panorama projection plane coordinate system. As to the geometric correction of the shot images, lens distortion is corrected. For example, a lens distortion correcting method by Weng et al. is employed which is disclosed in "Computer vision: Technical review and future prospects," pp. 42-44, New Technology Communication, 1998. As to the photometric correction of the shot images, limb darkening is corrected. For example, a method is employed in which one point light source with no time variation in intensity is set as a subject, a camera is allowed to oscillate so that the point light source comes to a desired point, and then, a correction coefficient of limb darkening is calculated with the use of the inverse number of an intensity at each observed point, as disclosed in "Project report of research and development project (next-generation video display/transmission system) in natural vision, 2000, pp. 51-53, Communication/broadcasting, 2001."

Figure 3:
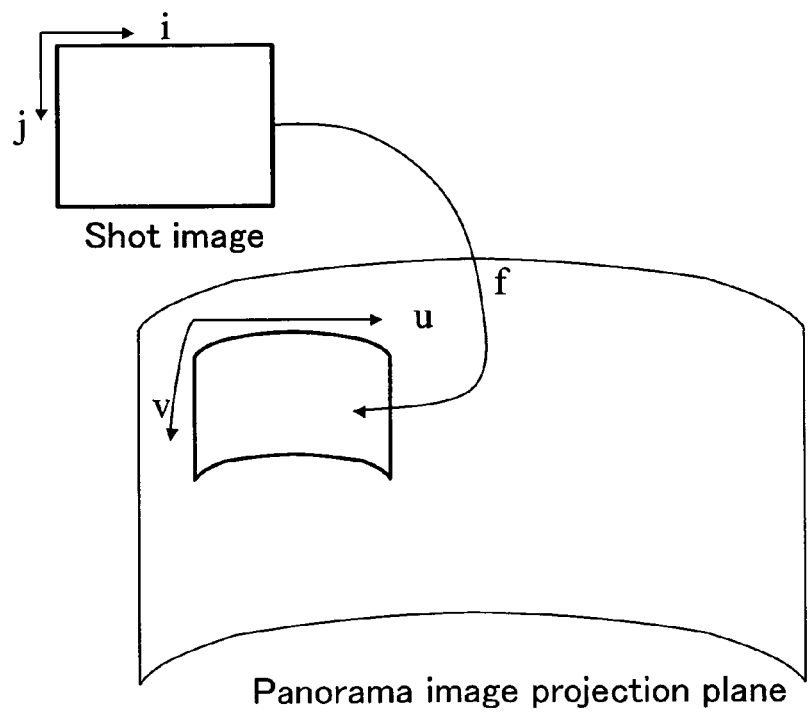
FIG. 3 is a diagram showing a method for transforming a coordinate system of a shot image to a panorama projection plane coordinate system.

Coordinate transformation to the panorama projection plane coordinate system is as shown in FIG. 3, for example. When supposing that f is a function for transformation from a coordinate system (i, j) of a shot image to a panorama projection plane coordinate system (u, v) subjected to projection to a cylindrical coordinate system, f is expressed by the following equation using the camera position/posture information sent from the image shooting section 101:

$$(u, v) = f(i, j, Xw, Yw, Zw, \theta, \phi) \qquad \text{Equation (1)}$$

Alternatively, the transformation from the coordinate system (i, j) of the shot image to the panorama projection plane coordinate system (u, v) may be performed by projection using a spherical coordinate system rather than the cylindrical coordinate system. In the case where the pan angle and the tilt angles are small, a plane coordinate system may be used for projection.

Wherein, each correction parameter used in the shot image correction section 102 is obtained in advance prior to object detection by the present equipment.

The shot image storage section 103 stores the images subjected to correction by the shot image correction section 102 and the camera position/posture information thereof into a storage medium. The storage medium is reduced to practice by, for example, a memory, a hard disc, a film, or the like.

<Generation of Small Region Panorama Image Group>

The small region panorama image group generation section 104 generates a small region panorama image group from a plurality of images stored in advance in the shot image storage section 103. The small region panorama image group is an image group for generating a predicted background image for a detection target image in processing thereafter.

The small region panorama image group herein is defined as "an aggregation of overlapped regions of N images, which have independency from each other, in a desired shooting range, wherein N is an integer larger than 2." More specifically, the small region panorama image group is an image group of N images, which include a common shooting range, are composed of a plurality of common partially overlapped regions, and have independency from each other in each of the partially overlapped regions, wherein N is an integer larger than 2. In the respective partially overlapped regions, the images are defined as those having independency when the following conditions are satisfied:

Each image includes N or more pixels having different normal directions.

The images are different in light source environment.

A specific example of the small region panorama image group will be described with reference to FIG. 4 and FIG. 5.

Figure 4:
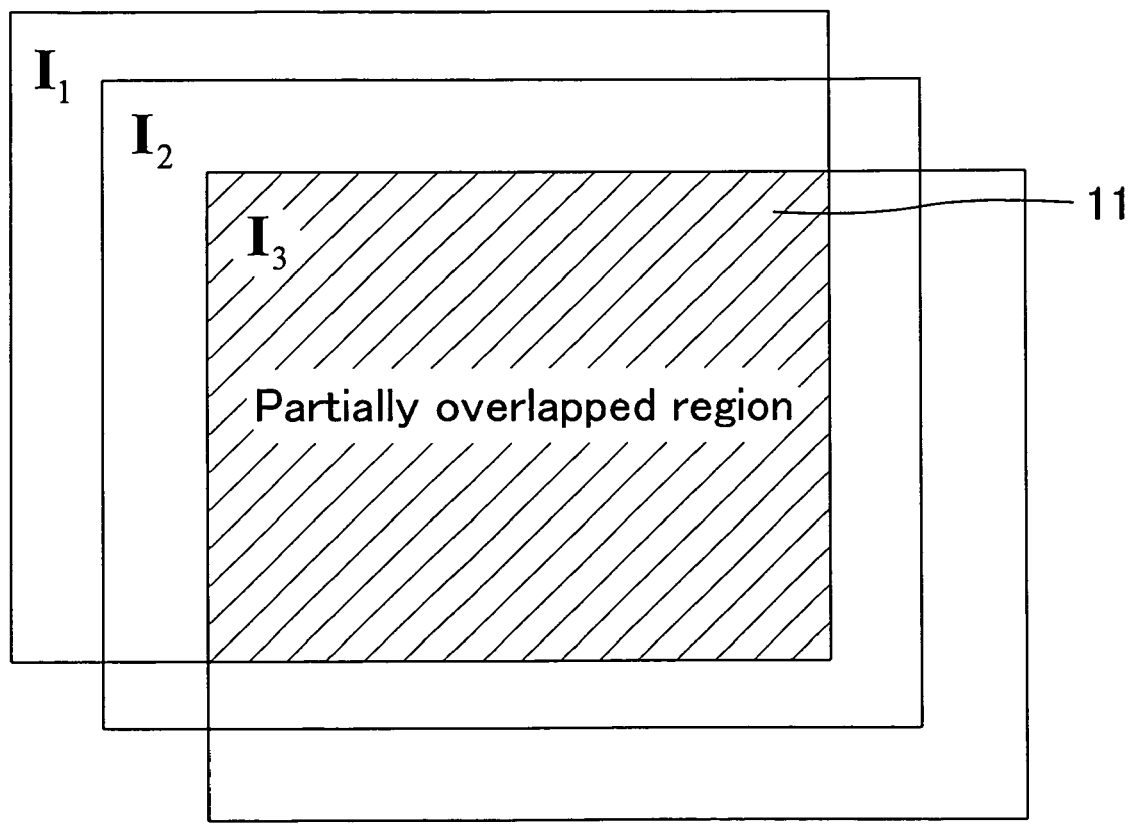
FIG. 4 is a schematic diagram showing an example of a partially overlapped region.

FIG. 4 is a schematic diagram showing the aforementioned partially overlapped region. The three images $I_1, I_2, I_3$ have independency (namely: images are different from each other in light source direction and each have three or more pixels different from each other in normal direction) and are overlapped with each other in a region 11 (partially overlapped region).

Figure 5:
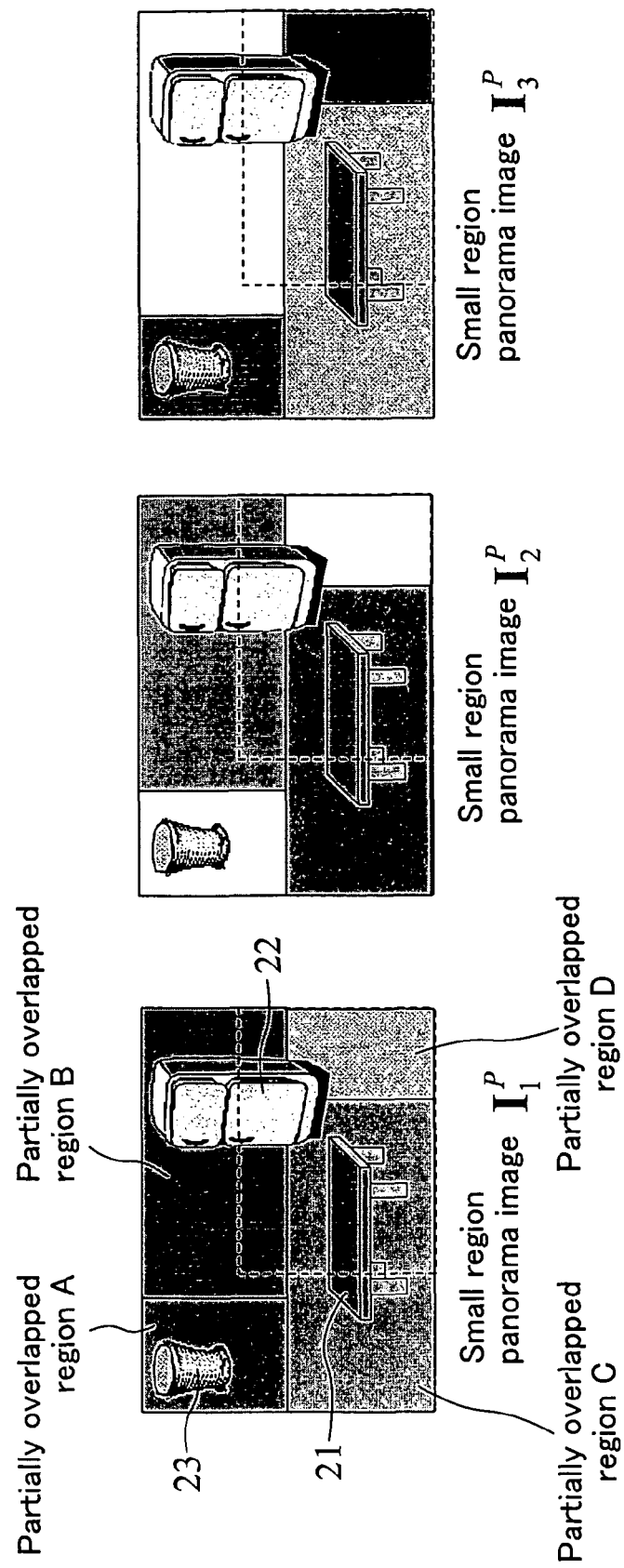
FIG. 5 is an illustration showing one example of a small region panorama image group.

FIG. 5 presents illustrations showing one example of the small region panorama image group. In FIG. 5, the number N of images of the small region panorama image group is set to 3. The three images $I_1^P, I_2^P, I_3^P$ reflect a common shooting range including a floor, a table 21, a refrigerator 22, and a trash can 23 as a background and are composed of common partially overlapped regions A (upper left), B (upper right), C (lower left), and D (lower right). The images $I_1^P, I_2^P, I_3^P$ have independency in each partially overlapped regions A to D. In other words, aggregations of images of the respective partially overlapped regions A, B, C, D having independency form an image set of $I_1^P, I_2^P$, and $I_3^P$ including the desired shooting range. Hence, the image set of $I_1^P, I_2^P, I_3^P$ satisfy the aforementioned definition of the small region panorama image group. Herein, each image belonging to the small region panorama image group is called a small region panorama image.

A processing flow by the small region panorama image group generation section 104 will be described below with reference to the flowchart of FIG. 6.

First in a step S11, one arbitrary image is selected from images stored in the shot image storage section 103.

Next, in a step S12, a region where N images including the selected image are overlapped with each other as shown in FIG. 4 is selected from the shooting range of the image selected in the step S11 as a partially overlapped region. The number N of the overlapped images is set to 3 herein for the sake of simple explanation. The method for determining the number N of overlapped images will be described later. For detecting the overlapped region of each image, the coordinate values of each image in the panorama projection plane coordinate system (u, v) is used, for example.

Subsequently, in a step S13, independency judgment is performed on the three images overlapped in the partially overlapped region selected in the step S12. When the judgment holds independency (Yes in the step S13), the routine proceeds to a step S15 for storing the thus selected partially overlapped region.

Figure 7:
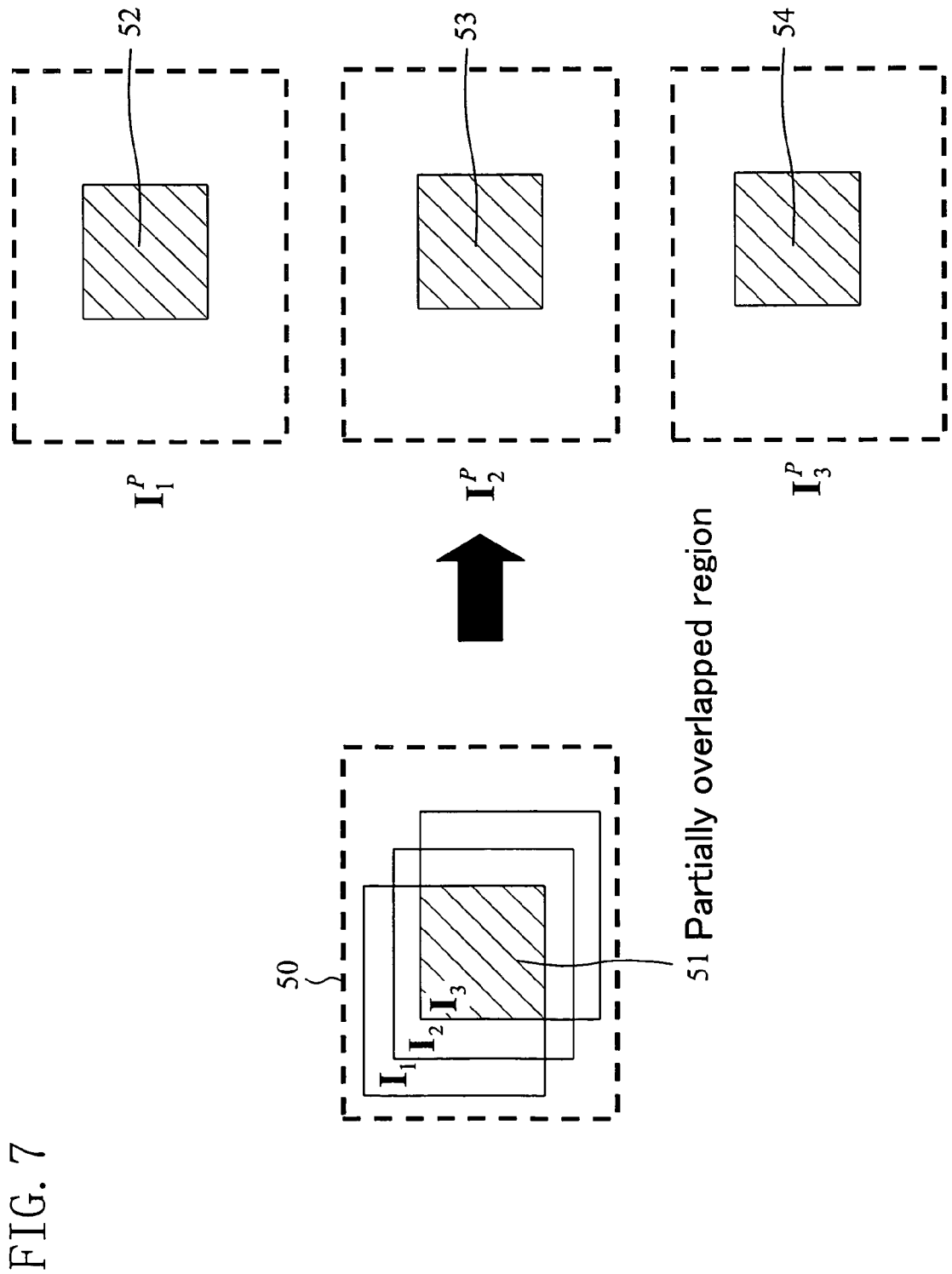
FIG. 7 is a conceptual diagram showing processing of storing a partially overlapped region.

FIG. 7 is a conceptual diagram showing processing in the step S15. In FIG. 7, the shot images $I_1, I_2, I_3$ are overlapped with each other in a partially overlapped region 51 in a desired shooting range 50 indicated by a broken line. The partially overlapped region 51 of each shot image $I_1, I_2, I_3$ is stored as respective parts of the small region panorama images $I_1^P, I_2^P, I_3^P$. In detail, a partially overlapped region 52 of the shot image $I_1$ is stored as a part of the small region panorama image $I_1^P$. As well, a partially overlapped region 53 of the shot image $I_2$ and a partially overlapped region 54 of the shot image $I_3$ are stored as a part of the small region panorama image $I_2^P$ and a part of the small region panorama image $I_3^P$, respectively.

When the judgment holds non-independency (No in the step S13), the routine proceeds to a step S14 for selecting a partially overlapped region of an image set which is different from the image set selected in the step S12 and includes the image selected in the step S11. Then, in the step S13, independency is judged again.

Figure 8:
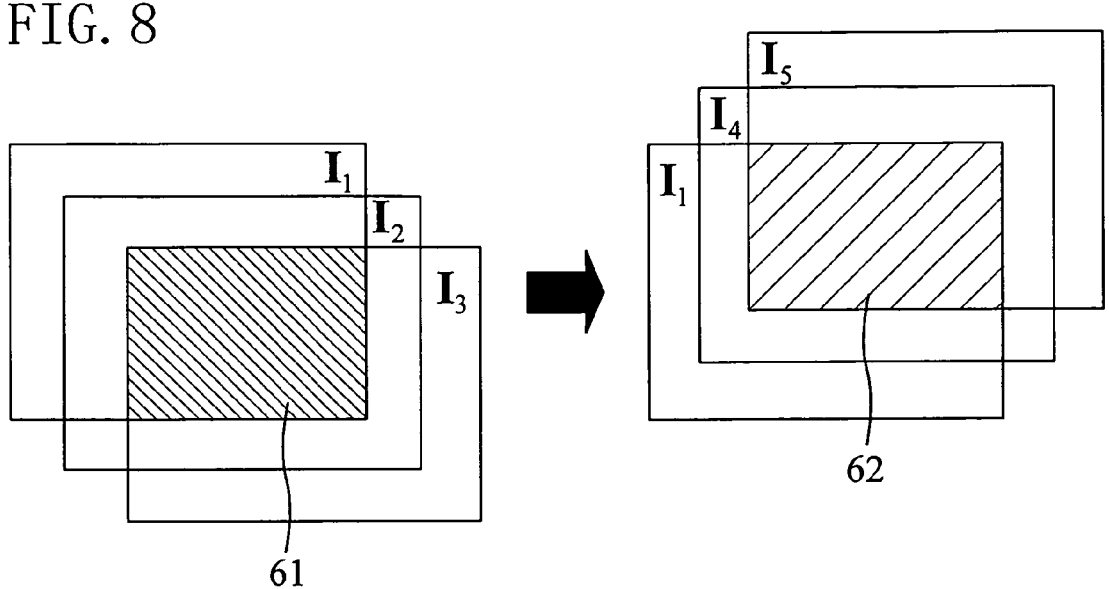
FIG. 8 is a conceptual diagram showing processing of performing re-selection of a partially overlapped region.

FIG. 8 is a diagram conceptually showing processing of the step S14. As shown in FIG. 8, suppose that the image $I_1$ is selected in the step S11 and that a partially overlapped region 61 where the image $I_1$ is overlapped with images $I_2, I_3$ is selected in the step S12. When the image set of $I_1, I_2, I_3$ is judged to have no independency in the partially overlapped region 61 in the step S13, a partially overlapped region 62 included in a different image set of $I_1, I_4, I_5$ including the selected image $I_1$ is selected.

(Method for Judging Independency)

The independency judgment in the step S13 can be performed, for example, in such a manner that one image (hereinafter referred to as an independency judging image) including a region overlapped with the selected partially overlapped region is selected and a linearization coefficient for the independency judging image is obtained. This method will be described below in detail.

Figure 9:
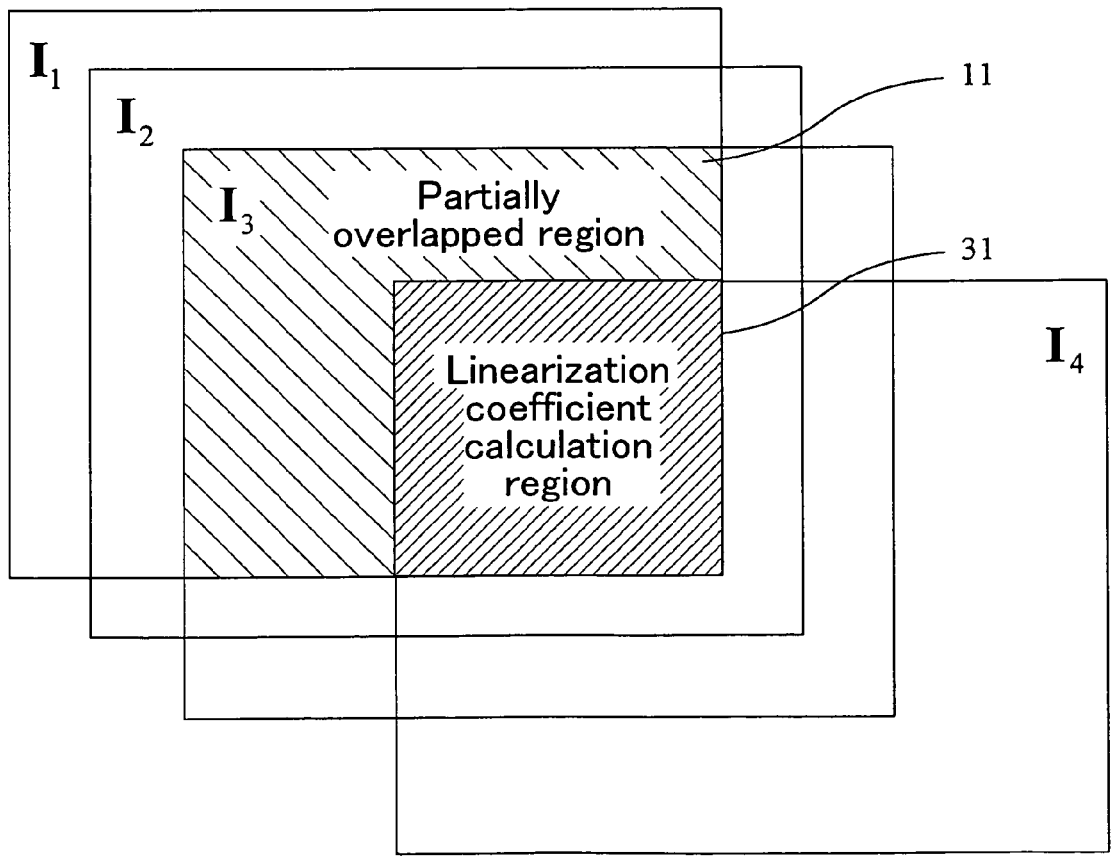
FIG. 9 is a schematic diagram showing the relationship between a partially overlapped region and an independency judging image.

FIG. 9 is a schematic diagram showing the relationship between the partially overlapped region and the dependency judging image. FIG. 9 shows an example where an independency judging image $I_4$ including a region (hereinafter referred to as a linearization coefficient calculation region) 31, which is overlapped with the partially overlapped region 11 indicted in FIG. 4, is selected with respect to the image set of $I_1, I_2$, and $I_3$ including the partially overlapped region 11. Namely, the four images $I_1, I_2, I_3, I_4$ are overlapped with each other in the linearization coefficient calculation region 31. It is noted that the linearization coefficient calculation region includes at least three pixels.

Calculation of the linearization coefficient is performed using the pixel values of each image in the linearization coefficient calculation region on the basis of the method by Shashua (Shashua A., "Geometry and Photometry in 3D Visual Recognition," P. D. thesis, Dept. Brain and Cognitive Science, MIT, 1992).

The linearization coefficient calculation by the method by Shashua will be described here in detail. Shashua shows that an image in which light source direction is arbitrary can be expressed by linear combination of three images different in light source direction on the assumption that a parallel light source is used as a light source and the surfaces of subjects are all Lambertian surfaces. Specifically, when supposing that three images different in light source direction in terms of vector are $I_1, I_2, I_3$, an image $I_4$ in which light source direction is arbitrary can be expressed by linear combination as in the following equation:

$$I_4 = c_4^1 I_1 + c_4^2 I_2 + c_4^3 I_3 \quad \text{(Equation 2)}$$

Accordingly, $c_4 = [c_4^1 \ c_4^2 \ c_4^3]^T$ is calculated as a linearization coefficient for the image $I_4$.

Figure 10:
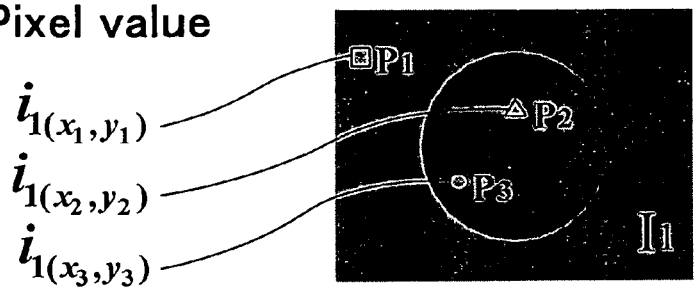
FIG. 10 is a diagram for explaining a method for calculating a linearization coefficient.
Figure 10:
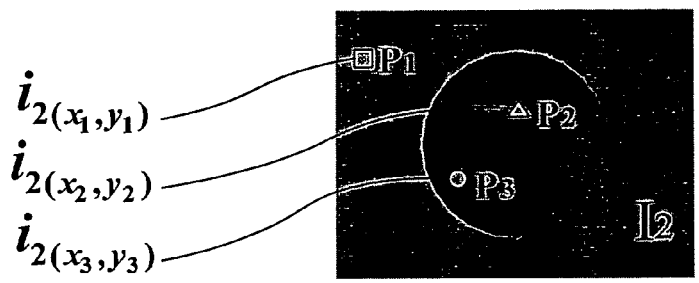
Figure 10:
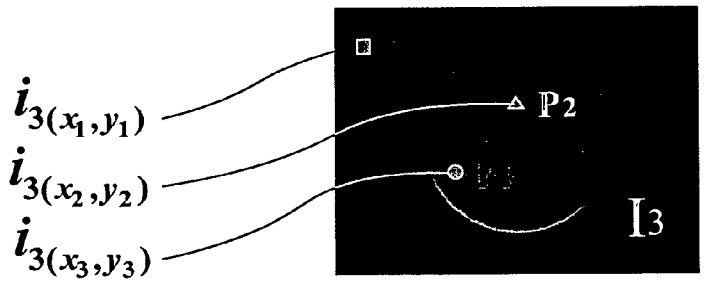
Figure 10:
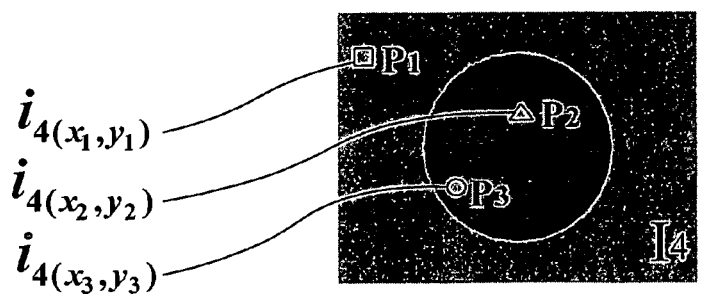

Specifically, as shown in FIG. 10, three points $P_1, P_2, P_3$ are selected in each of the four images $I_1, I_2, I_3, I_4$, and the linearization coefficient is calculated with the use of the following expression by utilizing each pixel value i of the pixel coordinate values $P_1(x_1, y_1), P_2(x_2, y_2), P_3(x_3, y_3)$ at the selected three points $P_1, P_2, P_3$.

$$\begin{bmatrix} i_{1(x_1,y_1)} & i_{2(x_1,y_1)} & i_{3(x_1,y_1)} \\ i_{1(x_2,y_2)} & i_{2(x_2,y_2)} & i_{3(x_2,y_2)} \\ i_{1(x_3,y_3)} & i_{2(x_3,y_3)} & i_{3(x_3,y_3)} \end{bmatrix} \cdot c_4 = \begin{bmatrix} i_{4(x_1,y_1)} \\ i_{4(x_2,y_2)} \\ i_{4(x_3,y_3)} \end{bmatrix} \quad \text{(Expression 1)}$$

-continued $$c_4 = \begin{bmatrix} i_{1(x_1,y_1)} & i_{2(x_1,y_1)} & i_{3(x_1,y_1)} \\ i_{1(x_2,y_2)} & i_{2(x_2,y_2)} & i_{3(x_2,y_2)} \\ i_{1(x_3,y_3)} & i_{2(x_3,y_3)} & i_{3(x_3,y_3)} \end{bmatrix}^{-1} \begin{bmatrix} i_{4(x_1,y_1)} \\ i_{4(x_2,y_2)} \\ i_{4(x_3,y_3)} \end{bmatrix}$$

$$= D^{-1} \begin{bmatrix} i_{4(x_1,y_1)} \\ i_{4(x_2,y_2)} \\ i_{4(x_3,y_3)} \end{bmatrix}$$

Wherein $$D = \begin{bmatrix} i_{1(x_1,y_1)} & i_{2(x_1,y_1)} & i_{3(x_1,y_1)} \\ i_{1(x_2,y_2)} & i_{2(x_2,y_2)} & i_{3(x_2,y_2)} \\ i_{1(x_3,y_3)} & i_{2(x_3,y_3)} & i_{3(x_3,y_3)} \end{bmatrix}$$

Wherein, $i_{k(x,y)}$ indicates a pixel value at pixel coordinates (x, y) in an input image $I_k$.

With Expression 1x, the linearization coefficient $c_4 = [c_4^1 \ C_4^2 \ c_4^3]^T$ can be calculated. This attains expression of the image $I_4$ in which light source direction is arbitrary with the use of $I_1$, $I_2$, $I_3$ and $c_4 = [c_4^1 \ C_4^2 \ c_4^3]^T$. Further, in the case where $D^{-1}$ cannot be calculated out, three points $P_1(x_1, y_1)$, $P_2(x_2, y_2)$, $P_3(x_3, y_3)$ are selected again. Details of methods for selecting three points $P_1$, $P_2$, $P_3$ and for deriving the linearization coefficient are disclosed in, for example, "Photometric linearization based on classification of photometric factors," (collection of Meeting on image recognition and comprehension (MIRU 2002), Vol. 2, pp. 167-176, 2002.

On the basis of the above described method by Shashua, calculation using Expression 1 is performed on the selected partially overlapped region included in each image to obtain the linearization coefficient. For this calculation, the linearization coefficient $c_4 = [c_4^1 \ C_4^2 \ c_4^3]^T$ is calculated with the use of the three images selected in the step S12 as $I_1$, $I_2$, $I_3$ and the independency judging image additionally selected in the step S13 as $I_4$.

Thereafter, the condition number of the matrix D is obtained with the use of the pixel values at the three points $P_1(x_1, y_1)$, $P_2(x_2, y_2)$, $P_3(x_3, y_3)$, which have been used for calculating the linearization coefficient $c_4$. When the condition number thereof is smaller than a threshold value, it is judged that the three images have independency in the selected partially overlapped region. Reversely, when the condition number thereof is larger than the threshold value, it is judged that the three images have no independency in the selected partially overlapped region.

Herein, a factor by which images are judged to have low independency is either of:

In any of the images, the normal direction is the same in two or more pixels of the selected three pixels.

The light source environment is the same in at least two images.

Accordingly, when a predicted background image for a detection target image is generated with the use of an image group having low independency, error in intensity becomes large. The error in intensity means error in intensity between an ideal background image shot under the same light source environment as that of the detection target image and a generated predicted background image.

In contrast, the images judged to have independency satisfy the conditions that the light source directions of the images are different from each other in the selected partially overlapped region and that each image in the selected partially overlapped region includes three or more pixels of which normal directions of the surfaces of the subjects are different from each other. When a predicted background image for a detection target image is generated with the use of an image group having such high independency, the error in intensity can be rather suppressed.

Further, as described herein, on the assumption that the light source is a parallel light source and the surface of an object is a Lambertian surface, an image in which light source direction is arbitrary can be synthesized with the use of four images. This means that the number N of the images each having a partially overlapped region can be set to 3 in the present embodiment.

Also, the diffuse reflection pixel means a pixel behaving under Equation 2.

Herein, in the step S13, the linearization coefficient is calculated with the use of an independency judging image including a region overlapped with the selected partially overlapped region, and the independency judgment is performed on the basis of the presence or absence of $D^{-1}$ and the condition number of D in Expression 1. However, any other scheme may be employed only if it uses the same reference.

For example, independency may be judged in such a manner that arbitrary three points $P_1(x_1, y_1)$, $P_2(x_2, y_2)$, $P_3(x_3, y_3)$ are selected in an image set in a selected partially overlapped region without using an additional independency judging image and $D^{-1}$ and the condition number of D are calculated with the use of the selected three points $P_1$, $P_2$, $P_3$. When no independency is held, re-selection of three points $P_1$, $P_2$, $P_3$ are performed and $D^{-1}$ and the condition number of D are calculated for re-judgment of independency. In the case where no criterion for independency is satisfied even though selection of three points P1, P2, P3 is repeated by a predetermined number of times, the images are judged to have no independency, and re-selection of a partially overlapped region is performed in the step S14. This attains independency judgment without selecting an additional independency judging image.

Thus, a partially overlapped region having independency can be selected through the steps S11 to S15.

Subsequently, in a step S16, it is judged whether or not the partially overlapped regions stored up to this time point fill the entire region of the desired shooting range. When it is judged that they do not fill the entire region (No in the step S16), an arbitrary image is selected in a region which no partially overlapped region fills (a step S17), and then, the routine returns to the step S12 for repeating the above described processing. Referring to specific judging scheme in the step S16, for example, it is judged that an aggregation of partially overlapped regions having independency fills the entire region when the number of pixels of the extended image becomes the number of pixels of the entire region of the desired shooting range.

Figure 11:
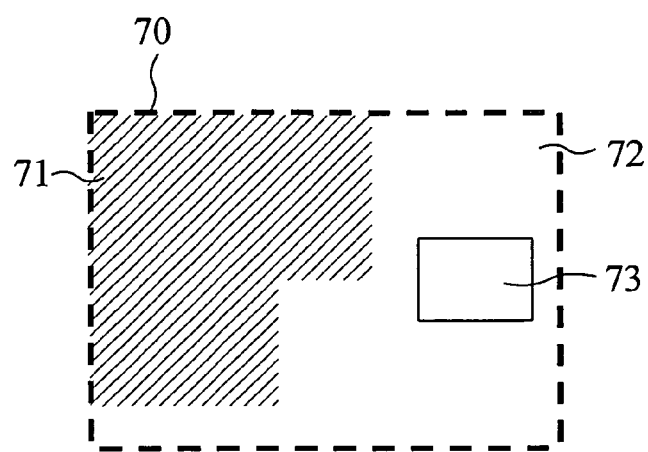
FIG. 11 is a conceptual diagram showing processing of performing re-selection of an image in a region which no partially overlapped region fills.

FIG. 11 is a diagram conceptually showing the processing in the step S17. FIG. 11 supposes that partially overlapped regions already fill a hatched region 71 in a desired shooting range 70 enclosed by a broken line. At that time point, it is judged in the step S16 that the partially overlapped regions do not fill the entire region of the desired shooting range 70. Then, in the step S17, re-selection of an arbitrary image 73 is performed in, for example, a non-hatched region 72.

On the other hand, judgment that partially overlapped regions fill the entire region (Yes in S16) means that a small region panorama image group is generated. Then, the thus generated small region panorama image group is stored in the small region panorama image group storage section 105 in a step S18. As to a storage medium, for example, a memory, a hard disc, a film, or the like is used, similarly to the shot image storage section 103.

Figure 6:
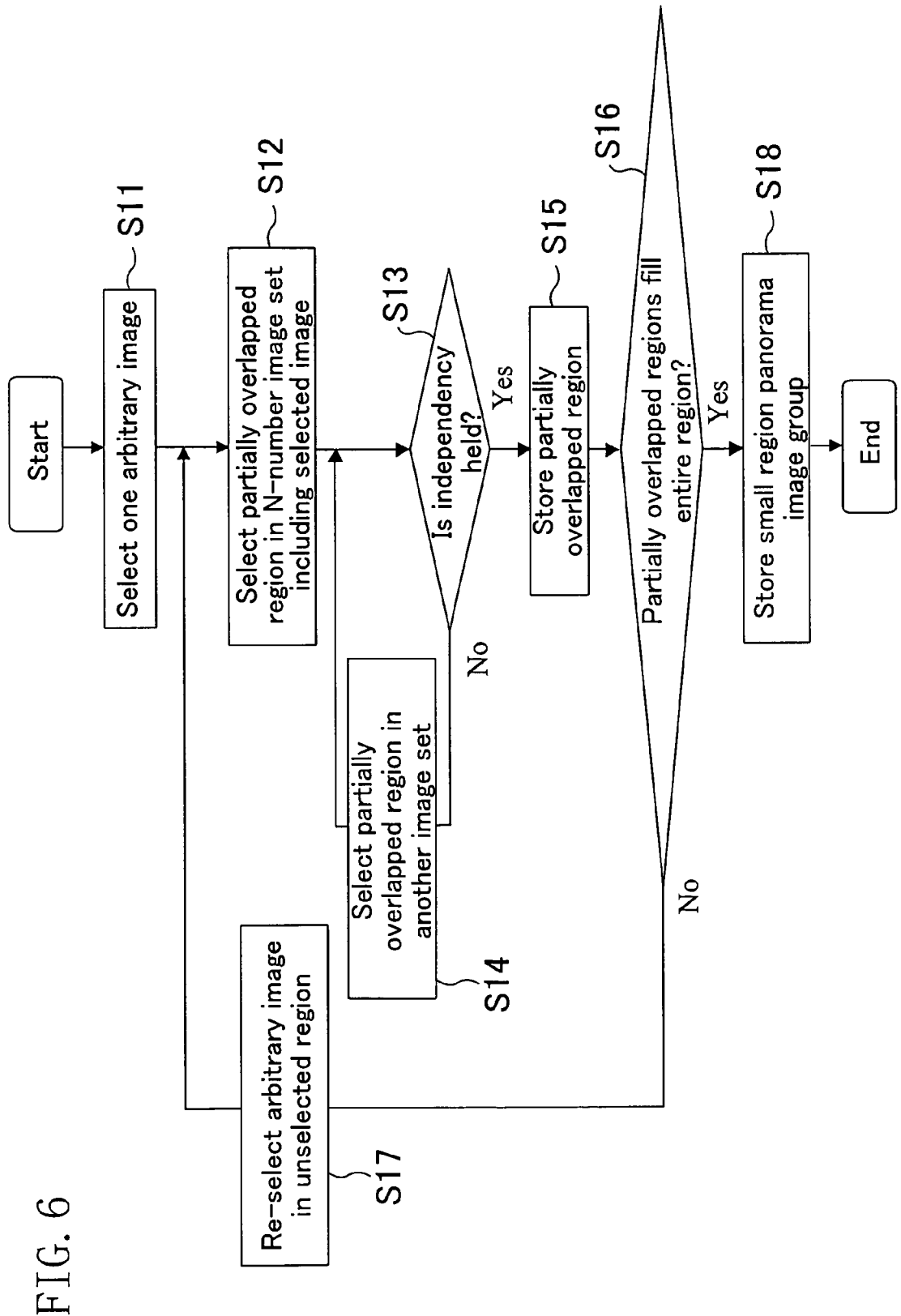
FIG. 6 is a flowchart showing processing of generating a small region panorama image group.

As described above, through the processing of the steps S11 to S18 in FIG. 6, the small region panorama image group is generated and stored in the small region panorama image group storage section 105, wherein the small region panorama image group includes N images each of which includes the common shooting range, is composed of a plurality of common partially overlapped regions, and has independency in each of the partially overlapped regions.

<Object Detection Using Small Panorama Image Group>

The object detection section 106 performs object detection on the detection target image received from the shot image correction section 102 with the use of the small region panorama image group stored in the small region panorama image group storage section 105. For object detection herein, background difference is employed, for example.

An example of object detection employing background difference in the present embodiment will be described next with reference to FIG. 5 and FIG. 12 to FIG. 14.

Figure 12:
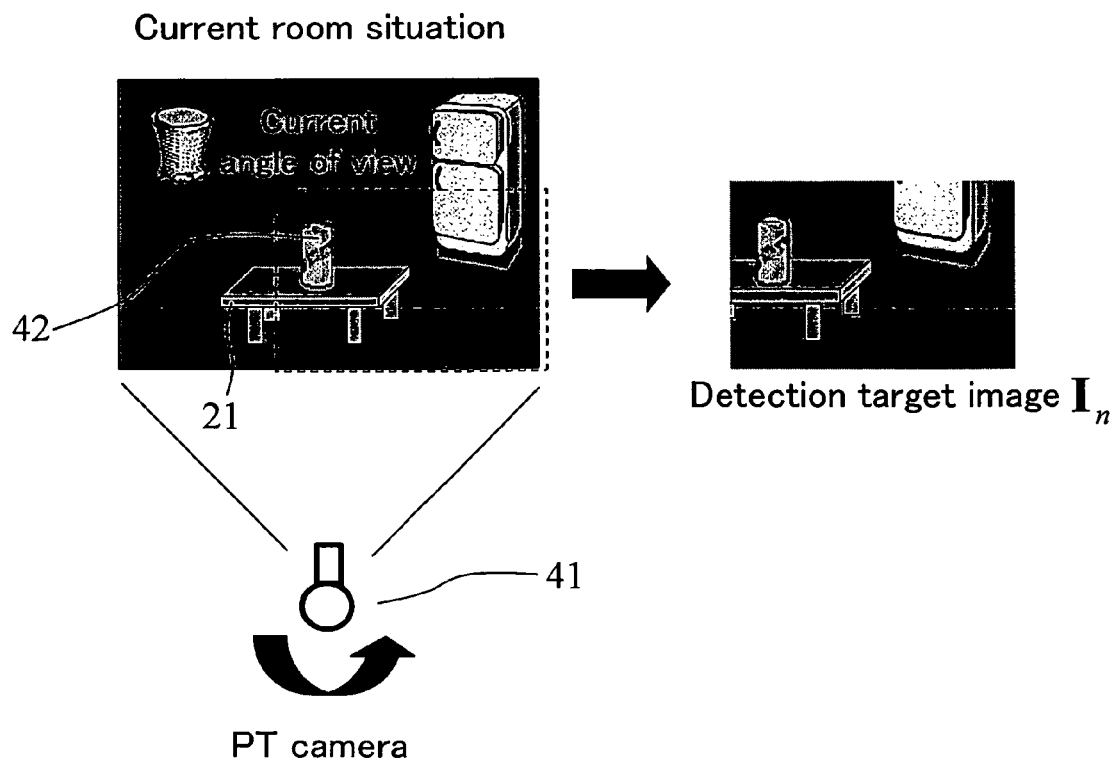
FIG. 12 is a illustration showing a situation where a detection target image is shot.

Suppose that an image $I_n$ (detection target image) is shot by a PT camera 41, as shown in FIG. 12. In the image $I_n$, there is an empty can 42 on a table 21. The images $I_1^P, I_2^P, I_3^P$ shown in FIG. 5 are used as small region panorama images with respect to the shooting region of the detection target image. In FIG. 5, each region of the images $I_1^P, I_2^P, I_3^P$ which corresponds to that in the image $I_n$ is indicated by the broken line. The images $I_1^P, I_2^P, I_3^P$ are already stored in the small region panorama image group storage section 105 prior to shooting of the detection target image.

Figure 13:
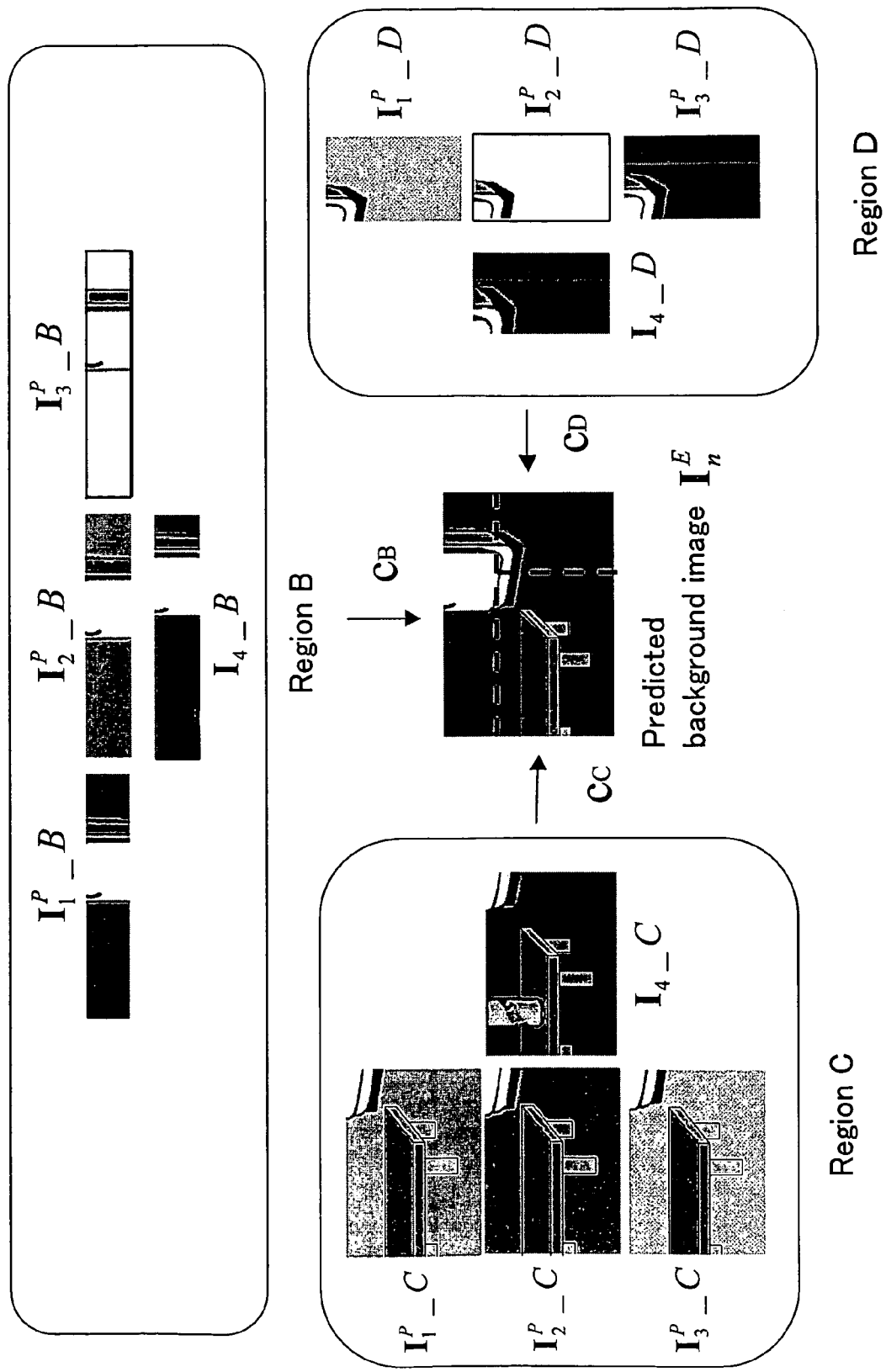
FIG. 13 is an illustration showing a method for generating a predicted background image.

Then, as shown in FIG. 13, an image corresponding to that in the shooting region of the image $I_n$ is cut out from each partially overlapped region (region B to D) of each small region panorama image $I_1^P, I_2^P, I_3^P$. For example, from the region B, images $I_1^P\_B, I_2^P\_B, I_3^P\_B$ are cut out. As well, an image $I_4\_B$ is cut out from the image $I_n$. Similarly, images $I_1^P\_C, I_2^P\_C, I_3^P\_C, I_4\_C$ and images $I_1^P\_D, I_2^P\_D, I_3^P\_D, I_4\_D$ are cut out from the region C and the region D, respectively.

By utilizing these images, respective linearization coefficients $c_B, c_C, c_D$ in the respective partially overlapped regions B, C, D are calculated with the use of Expression 1. For example, the linearization coefficient $c_B = [c_B^1 \ c_B^2 \ c_B^3]^T$ for the image $I_4\_B$ is calculated with the use of the images $I_1^P\_B, I_2^P\_B, I_3^P\_B$. Due to the presence of an object (the empty can 42 in FIG. 12) besides the background in the image $I_n$, points other than the background would be selected as the three points $P_1, P_2, P_3$ in calculating a linearization coefficient with the use of Expression 1. For example, points $P_1, P_2, P_3$ would be selected in a region where the empty can 42 is reflected. If so selected, a linearization coefficient cannot be calculated accurately. However, three points $P_1, P_2, P_3$ on the background component can be selected from all of the four images by employing, for example, RANSAC (see M A. Fischlerand, R. C. Bolles, "Random sample consensus: a paradigm for model fitting with application to image analysis and automated cartography," Commun, Assoc, Comp., pp. 381-395, Mar. 24, 1981). Further, employment of the RANSAC attains calculation of a linearization coefficient with no influence of an object other than a background involved (specifically, see "Photometric linearization based on classification of photometric factors," (collection of Meeting on image recognition and comprehension (MIRU 2002), Vol. 2, pp. 167-176, 2002).

The thus calculated linearization coefficients $C_B, c_C, C_D$ and the pixel values of the images $I_1^P, I_2^P, I_3^P$ are substituted into Equation 2 to generate predicted background images of the respective partially overlapped regions B, C, D. Then, the generated predicted background images are joined together. Thus, a predicted background image $I_n^E$ for the detection target image $I_n$ shot under the current illumination condition is generated.

Figure 14:
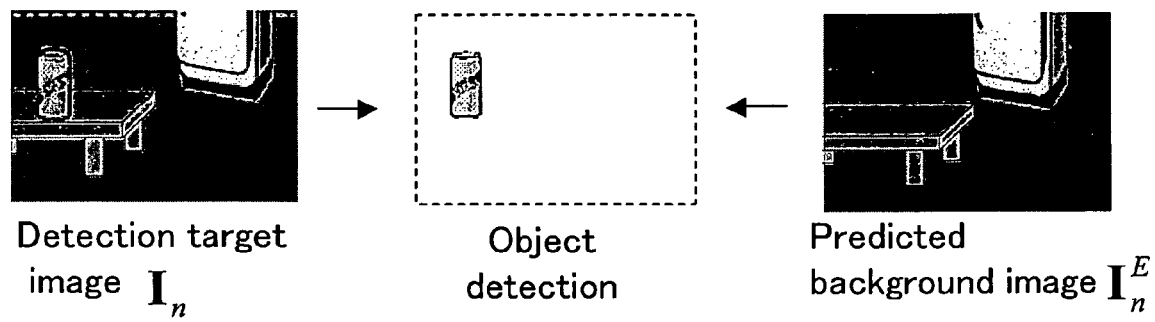
FIG. 14 is an illustration showing a method for performing object detection using the predicted background image.

Next, as shown in FIG. 14, the thus generated predicted background image $I_n^E$ is compared with the original detection target image $I_n$ to detect, as an object region, a region of which difference in pixel value is larger than a predetermined threshold value.

The detected object display section 107 displays the object region detected by the object detection section 106 in a display device such as a monitor.

As described above, in the present embodiment, a predicted background image in which light source environment is the same as that of a target image can be generated by utilizing the linearity in a small region panorama image group composed of N images each of which is composed of common overlapped regions in a range including a shooting range of the detection target image and has independency from each other, wherein N is an integer larger than 2. Utilization of the thus generated predicted background image attains object detection from an image shot under arbitrary light source environment.

Further, even in a case using images each shot in an arbitrary shooting direction so that the shooting directions are different from each other, a predicted background image corresponding to the entire region of a target image can be generated by generating a small region panorama image group composed of N images having independency from each other in a desired shooting range, wherein N is an integer larger than 2.

In the present embodiment, the linearization coefficients are calculated with the use of Expression 1, wherein Expression 1 is an expression on the assumption that every pixel of the selected three points $P_1, P_2, P_3$ is a diffuse reflection pixel. In actual environment, an image includes components other than diffuse reflection, such as specular reflection, and therefore, Expression 1 would be not necessarily be held. However, when the method by Shakunaga et al. is employed (specifically, see "Photometric linearization based on classification of photometric factors," (collection of Meeting on image recognition and comprehension (MIRU 2002), Vol. 2, pp. 167-176, 2002), three points $P_1, P_2, P_3$ of which pixels are all diffuse reflection pixels can be selected with no influence of pixel values of pixels other than the diffuse reflection pixel involved.

Moreover, in the present embodiment, since the parallel light source is assumed as a light source, accurate linearization coefficients can be calculated with the use of three images as base images for object detection. However, a light source under actual environment includes ambient light such as interflection or the like. Therefore, if the linearization coefficients would be calculated with the use of three images as base images, only a linearized image with large error could be obtained from actual images. However, when more images are used, accurate linearization coefficients can be calculated even if the images are shot under a light source condition including such ambient light, and accordingly, image expansion and object detection utilizing image linearization can be performed, similarly to the present embodiment. For example, "Separation of reflection components based on frequency characteristics of bidirectional reflectance distribution functions," Technical Report of Information Processing Society of Japan, CVIM 2002-134-1, pp. 1-8, 2002, already showed that a linearized image with less error can be generated with the use of four to nine images shot even under light environment including ambient light.

Furthermore, in the present embodiment, the operations of the object detecting equipment in FIG. 1 are described in the order of:

Shooting is performed, and shot images are corrected and stored.

A small region panorama image group is generated with the use of the stored shot images and is stored.

A predicted background image is synthesized with the use of the stored small region panorama image group and a detection target image shot after storage of the small region panorama image group, and object detection is performed.

However, the processing may be performed in the order of:

Shooting is performed, and shot images are corrected and stored.

Small region panorama image groups corresponding to a shooting range of a detection target image are sequentially generated for the detection target image.

Predicted background images are synthesized with the use of the thus generated small region panorama image groups and the detection target image, and object detection is performed.

In this case, object detection can be performed by generating a predicted background image by generating a small region panorama image group only in the shooting range of the detection target image, rather than advance generation of the small region panorama image group in the entire desired shooting range.

It is noted that the predicted background image generated with the use of the small region panorama image group as described in the present embodiment is applicable to those for the purpose other than object detection. For example, the background image predicted for a target image is a diffuse reflection region entirely and, therefore, is an image from which a specular reflection region is removed. This means generation of a background image with excellent viewability for a human.

As well, the generated predicted background image is a diffuse reflection region entirely and, therefore, is an image from which a cast shadow is removed. The cast shadow means a shadow occurring on the surface of an object when another object intercepts a light beam. Hence, a background image can be generated in which a region practically invisible due to the presence of a shadow is visible.

The image generating method and the object detecting method according to the present invention can be reduced to practice by allowing a computer to execute a program recorded in a computer-readable recording medium, for example.

Figure 15:
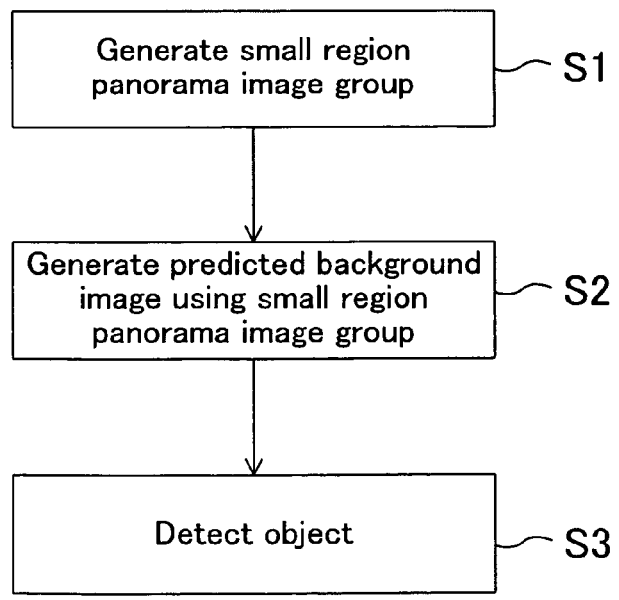
FIG. 15 is a flowchart showing an image generating method and an object detecting method according to one embodiment of the present invention.

FIG. 15 is a flowchart showing the image generating method and the object detecting method according to the present embodiment. As shown in FIG. 15, a small region panorama image group is generated in a step S1; a predicted background image is generated for a target image in a step S2 with the use of the small region panorama image group generated in the step S1; and the target image and the predicted background image generated in the step S2 are compared with each other for detecting an object reflected in the target image in a step S3. The steps S1 and S2 correspond to the image generating method and the steps S1 to S3 correspond to the object detecting method.

In the present invention, a predicted background image can be generated of which light source environment is the same as that of an image shot under arbitrary light source environment. Therefore, the present invention is useful for intruder detection and the like in a monitoring system installed in a place where light environment changes frequently, such as outdoors.

What is claimed is:

1. A computer readable medium having stored therein instructions for an image generating method, the method comprising:

a first step of generating a small region panorama image group which is an image group of N images which include a shooting range common to each other, the N images being composed of a plurality of common partially overlapped regions and having independency from each other in each of the partially overlapped regions, wherein N is an integer larger than 2; and a second step of generating, for a target image obtained by shooting at least a part of the shooting range, a predicted background image in which light source environment is the same as that of the target image with the use of the target image and the small region panorama image group.

2. A computer readable medium having stored therein instructions for an image generating method, the method comprising:

a first step of generating a small region panorama image group which is an image group of N images which include a shooting range common to each other, the N images being composed of a plurality of common partially overlapped regions and having independency from each other in each of the partially overlapped regions, wherein N is an integer larger than 2; and a second step of generating, for a target image obtained by shooting at least a part of the shooting range, a predicted background image in which light source environment is the same as that of the target image with the use of the target image and the small region panorama image group, wherein the first step includes the steps of:

selecting N images each including an overlapped region from a plurality of original images;

judging independency of the selected N images in the overlapped region;

storing, when independency is held, pats in the overlapped region of the N images as images of a partially overlapped region in the small region panorama image group; and performing, when no independency is held, re-selection of N images each including an overlapped region.

3. A computer readable medium having stored therein instructions for an image generating method, the method comprising:

a first step of generating a small region panorama image group which is an image group of N images which include a shooting range common to each other, the N images being composed of a plurality of common partially overlapped regions and having independency from each other in each of the partially overlapped regions, wherein N is an integer larger than 2; and a second step of generating, for a target image obtained by shooting at least a part of the shooting range, a predicted background image in which light source environment is the same as that of the target image with the use of the target image and the small region panorama image group, wherein the second step includes, when the target image spreads across a plurality of partially overlapped regions, the steps of:

calculating linearization coefficients for the target image in each of the partially overlapped regions with the use of the target image and the small region panorama image group; and generating the predicted background image with the use of the calculated linearization coefficients and the small region panorama image group.

4. A computer readable medium having stored therein instructions for an object detecting method comprising the steps of:

a first step of generating a small region panorama image group which is an image group of N images which include a shooting range common to each other, the N images being composed of a plurality of common partially overlapped regions and having independency from each other in each of the partially overlapped regions, wherein N is an integer larger than 2; and a second step of generating, for a target image obtained by shooting at least a part of the shooting range, a predicted background image in which light source environment is the same as that of the target image with the use of the target image and the small region panorama image group;

the predicted background image for a detection target image serving as the target image; and detecting an object reflected in the detection target image by comparing the detection target image and the predicted background image with each other.

5. Object detecting equipment comprising:

a small region panorama image group generation section for generating, with the use of a plurality of images stored in a shot image storing section, a small region panorama image group which is an image group of N images which include a shooting range common to each other, the N images being composed of a plurality of common partially overlapped regions and having independency from each other in each of the partially overlapped regions, wherein N is an integer larger than 2; and an object detection section for detecting an object reflected in a detection target image obtained by shooting at least a part of the shooting range by generating a predicted background image in which light source environment is the same as that of the detection target image is generated for the detection target image with the use of the detection target image and the small region panorama image group and comparing the detection target image and the predicted background image with each other.

6. A computer readable program for allowing a computer to execute image generation, wherein the computer executes:

a first step of generating a small region panorama image group having N images, wherein the N images have a common shooting range, wherein each of the N images is composed of a plurality of common partially overlapped regions within the common shooting range, wherein each of the pluralities of partially overlapping regions are substantially the same for each of the N images, and wherein each of the N images are independent from the other N−1 images, such that a light source direction of each of the N images is different from the light source directions of the other N−1 images, wherein N is an integer larger than 2;

a second step of shooting a target image having a light source environment, wherein at least a portion of the target image is within the common shooting range, and wherein the target image includes an object in the common shooting range that is absent from the N images; and a third step of generating a predicted background image corresponding to a portion of the target image obstructed by the object, the background image having a predicted light source environment substantially similar to the light source environment of the target image, wherein the predicted background image is generated using the overlapping regions of the N images and a portion of the target image corresponding to the overlapping regions of the N images.

* * * * *